United States Patent Office 3,466,537
Patented Sept. 9, 1969

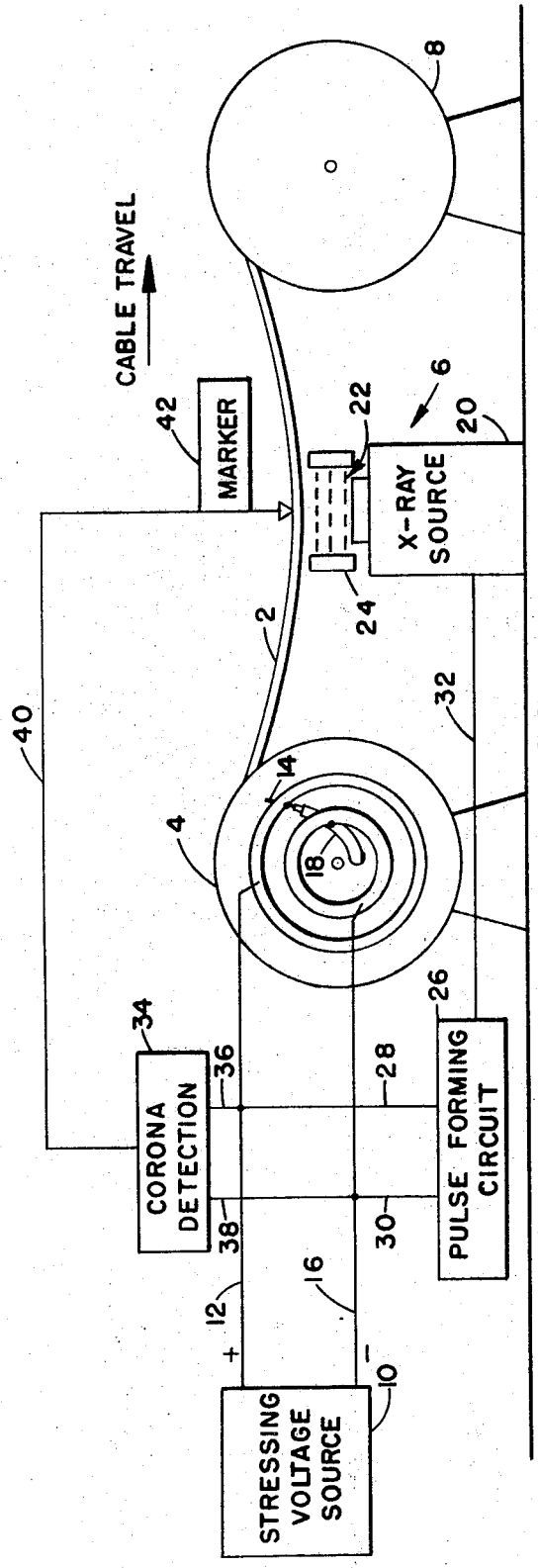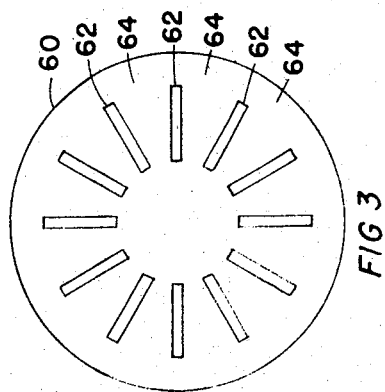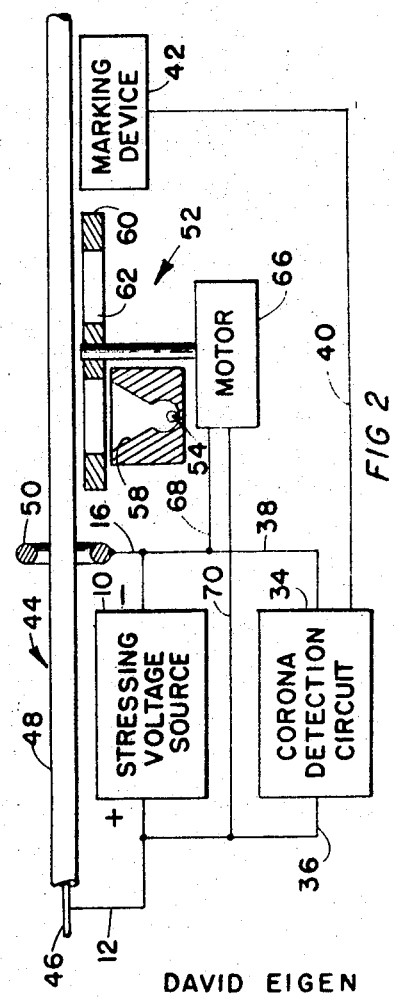

3,466,537
CABLE SCANNING METHOD AND APPARATUS UTILIZING SHORT BURSTS OF HIGHLY PENETRATING RADIATION
David Eigen, Passaic, N.J., assignor to The Okonite Company, Passaic, N.J., a corporation of Delaware
Filed Aug. 22, 1966, Ser. No. 573,904
Int. Cl. G01r 31/12
U.S. Cl. 324—54         32 Claims

ABSTRACT OF THE DISCLOSURE

The invention relates to a method and apparatus for detecting discontinuities in an electric cable. A stressing voltage is applied between an electrode external to the cable and a conductor internal to the cable. The magnitude of the stressing voltage is sufficient to cause some ionization of dielectric discontinuities with the cable but below the corona inception level. While the stressing voltage is applied, the cable is irradiated with short bursts of highly penetrating radiation to cause bursts of corona discharge in the dielectric discontinuities. The corona discharge is then detected.

---

This invention relates to cable inspection and is particularly directed to methods and apparatus for detecting dielectric discontinuities contained in electric cable.

In the manufacture of electric cable, one or more electrical conductors are enclosed within a layer of electrically insulating material which, in turn, may be covered by an electrically conductive sheath. However, in the course of such manufacture, it is possible for dielectric discontinuities, such as impurities or gas cells, to be included in the cable and it has been found that such dielectric discontinuities are potential sources of failure of the cable. Accordingly, it is desirable to inspect the cable, during manufacture, to attempt to locate any dielectric discontinuities contained in the cable. One prior art technique of inspecting cable has been to apply a stressing voltage between a conductor internal of the cable and an external electrode at a magnitude sufficient to cause ionization to build up and discharge within dielectric discontinuities contained in the cable, and to detect corona discharge resulting from the discharge of ionization. However, this technique requires that the magnitude of the stressing voltage be above the corona inception level with the result that continuous corona discharge occurs in any dielectric discontinuity. Unfortunately, it has been difficult to distinguish such continuous corona discharge from electrical "noise" caused by operation of electrical equipment, sparking, or other electrical disturbances occurring in the vicinity of the inspection operation. Moreover, it has been found that the corona inception level increases as the size of the dielectric discontinuities decreases. Thus, in some instances, stressing voltages have been applied which were above the breakdown level of the insulation, resulting in destruction of the cable. More insidiously, stressing voltages have been applied which have caused a permanent reduction of the quality of the insulation. This condition is undetectable, but results in premature failure of the cable after installation. In addition, the prior art techniques have required equipment, such as water tanks, which is bulky, expensive, and requires considerable maintenance.

These disadvantages of the prior art are overcome with the present invention, and a method and apparatus for cable inspection are provided which make it possible to greatly reduce the magnitude of the stressing voltage required to detect dielectric discontinuities of any given size, while significantly improving the signal-to-noise ratio of the detected signal. In addition, the method of the present invention may be employed with sheathed, as well as unsheathed cable. At the same time, the apparatus of the present invention is much less expensive and complex than that of the prior art, with the result that the apparatus may, if desired, be made portable so as to permit inspection in the field of cable which has been installed.

The advantages of the present invention are preferably attained by applying a stressing voltage between a conductor internal to the cable and an external electrode, such as the sheath, at a magnitude substantially below the corona inception level, and periodically irradiating the cable with pulses of highly penetrating radiation, such as X-rays or gamma rays to cause discharge of ionization in dielectric discontinuities contained in the cable. This results in sharp bursts of corona discharge which are readily distinguishable from noise signals.

Accordingly, it is an object of the present invention to provide improved methods and apparatus for inspecting electric cable.

Another object of the present invention is to provide methods and apparatus for improving the signal-to-noise ratio of the signals detected during cable inspection.

An additional object of the present invention is to provide methods and apparatus for inspecting sheathed, as well as unsheathed, cable.

A further object of the present invention is to provide improved apparatus for cable inspection which is less complex and expensive, and requires less maintenance than the apparatus of the prior art.

Another object of the present invention is to provide methods and apparatus which permit inspection in the field of cable which has been installed.

A specific object of the present invention is to provide improved methods and apparatus for inspecting cable by applying a stressing voltage between a conductor internal of the cable and an external electrode, such as the sheath, at a magnitude substantially below the corona inception level, and periodically irradiating the cable with pulses of highly penetrating radiation to cause discharge of ionization in dielectric discontinuities contained in the cable.

These and other objects and features of the present invention will be apparent from the following specification and claims, taken with reference to the figures of the accompanying drawing.

In the drawing:

FIGURE 1 is a diagrammatic representation of cable inspection apparatus embodying the present invention;

FIGURE 2 is a diagrammatic representation of an alternative form of the source of pulsed, penetrating radiation for use with the apparatus of FIG. 1; and FIGURE 3 is a plan view of the rotatable shield of the device of FIG. 2.

In that form of the present invention chosen for purposes of illustration in FIG. 1, a cable 2, to be inspected, is shown being drawn from a let-off reel 4, past the inspection device, indicated generally at 6, to a take-up reel 8. The reels 4 and 8 are shown as convenient means for causing relative movement between the cable 2 and the inspection device 6. However, aside from this function, the reels 4 and 8 have no necessary cooperation with the inspection device 6 and it will be apparent that other means could be provided for moving the cable 2 past the inspection device 6. Alternatively, if desired, the inspection device 6 could be made portable and could be moved along the cable 2. This would permit use of the inspection device 6 to inspect cable which has been installed in the field.

To apply a stressing voltage to the cable 2, a voltage source 10 is provided having one lead 12 connected to a conductor 14 internal to the cable 2 and having the second lead 16 connected to an electrode external to the cable 2, such as the cable sheath 18. The leads 12 and 16 may be connected to the cable 2 in any convenient manner, as by slip rings or the like. The voltage source 10 may be a source of either alternating or direct voltage, and applies a stressing voltage between the conductor 14 and electrode 18 at a magnitude which is sufficient to cause some ionization to occur within dielectric discontinuities contained in the cable 2, but which is substantially below the corona inception level.

A pulsed source of highly penetrating radiation, such as grid controlled X-ray source 20, is positioned adjacent the cable 2 and is oriented to periodically irradiate the cable 2 with bursts of highly penetrating radiation, as indicated at 22. If desired, suitable shielding means 24 may be provided to contain the radiation within a desired area. To pulse the source 20, a suitable pulse forming circuit 26 is connected by leads 28 and 30 to the leads 12 and 16, respectively, of the voltage source 10, and has an output lead 32 which supplies pulses formed by the pulse forming circuit 26 to the control grid of the grid-controlled X-rays source 20. Finally, a suitable corona detection circuit 34 is connected by leads 36 and 38 to the leads 12 and 16, respectively, of voltage source 10, and has an output lead 40 which is connected to a suitable marking device 42 positioned adjacent the cable 2.

In operation, voltage source 10 applies a stressing voltage between a conductor 14 internal to the cable 2 and an electrode external to the cable 2, such as the cable sheath 18, at a magnitude which is sufficient to cause some ionization within any dielectric discontinuity contained in the cable 2, but which is substantially below the corona inception level. It has been found that a direct voltage having a maximum value of about 300 volts, or an alternating voltage having a peak-to-peak value of about 50% above the rated voltage of the cable is satisfactory. The voltage source 10 also serves to energize the pulse forming circuit 26 and corona detection circuit 34. Pulse forming circuit 26 supplies pulsed signals to the control grid of the grid-controlled X-ray source 20 to cause the X-ray source 20 to provide intermittent bursts of penetrating radiation. The duration and repetition rate of the pulses will depend upon the rate of movement of the cable 2 with respect to the inspection device 6. As an example, for a cable throughput of 200 feet per minute, it has been found satisfactory to employ a 60 cycle per second pulsing rate, which results in three radiation pulses, each of about nine milliseconds duration, for each two inches of cable.

It has been found that highly penetrating radiation is also strongly ionizing. As a result, the bursts of highly penetrating radiation cause ionization to build up strongly and discharge substantially instantaneously. The resulting corona discharge is comparable in magnitude with that obtained in the prior art only with extremely high stressing voltages. Moreover, because the radiation from source 20 is pulsed, the corona discharge will be similarly pulsed, whereas electrical "noise" signals are generally continuous. Thus, the corona discharge signals are readily distinguishable, so that the signal-to-noise ratio seen by the corona detection circuit 34 is greatly improved. When the corona detection circuit 34 detects corona discharge having a magnitude above a predetermined level, the corona detection circuit 34 supplies a signal through output lead 40 to cause the marking device 42 to paint or otherwise mark the portion of the cable 2 in which the corona discharge occurred.

FIG. 2 illustrates an alternative form of the invention. In this form, the cable 44, to be inspected, is an unsheathed cable having a conductor 44 internal to the cable covered by a layer of insulating material 48. Thus, the stressing voltage source 10 has one lead 12 connected to the internal conductor 46 of cable 44, and has its second lead 16 connected to an electrode external to the cable 44, such as ring electrode 50. The source of pulsed, penetrating radiation is indicated generally at 52 and, as shown, comprises a source 54 of gamma rays, such as radium, contained within a body 56 of shielding material, such as lead. The body 56 is formed with an opening 58 in one side thereof to permit gamma rays from the source 54 to irradiate the cable 44. Since electrode 50 applies the stressing voltage to the unsheathed cable 44 only locally, the radiation source 52 should be positioned adjacent electrode 50 so that the radiation pulses will be applied to the portion of the cable 44 which is under stress. To permit pulsing of the radiation from source 52, a disk 60 may be provided formed of shielding material, such as lead, and having a plurality of radially extending slots 62 separated by portions 64 which are opaque to the radiation from source 52. The disc 60 is interposed between the opening 58 of body 56 and the cable 44, and is mounted for rotation by a motor 66 which may be energized by any suitable means, as by voltage source 10 through leads 68 and 70. When the slots 62 of disc 60 are aligned with opening 58 of body 56, radiation will be passed from source 54 to irradiate the cable 44. In contrast, when the portions 64 of disc 60 are aligned with the opening 58 of body 56, the radiation from source 54 will be blocked. Thus, as disc 60 is rotated by motor 66, the radiation from source 54 will be passed and blocked, alternately, to provide successive pulses of radiation. The duration and repetition rate of the pulses is determined by the size and spacing of the slots 62 and by the rate of rotation of the disc 60 by motor 66. Obviously, these factors may be varied substantially as desired. The operation of this form of the invention is substantially identical with that of the apparatus of FIG. 1.

It will be apparent that the gamma ray source 52 of FIG. 2 and the X-ray source 20 of FIG. 1 could be interchanged. Moreover, other sources of pulsed, highly penetrating radiation could be substituted for either of these. It will also be seen that the apparatus of either figure could be made portable so that it could be moved along the cable. This would permit use of the apparatus to permit inspection in the field of cable after it has been installed. Alternatively, the apparatus could be fixedly mounted and any suitable means could be provided to move the cable past the apparatus for inspection. In addition, numerous other variations and modifications may, obviously, be made without departing from the invention. Accordingly, it should be clearly understood that the forms of the present invention described above and shown in the figures of the accompanying drawing are illustrative only and are not intended to limit the scope of the invention.

What is claimed is:
1. The method of inspecting electric cable comprising the steps of:
   applying a stressing voltage between a conductor internal to a cable to be inspected and an electrode external to said cable at a magnitude sufficient to cause some ionization of dielectric discontinuities within said cable but below the corona inception level,
   periodically irradiating said cable while the stressing voltage is so applied, with short bursts of highly penetrating radiation to cause bursts of corona discharge in said dielectric discontinuities, and
   detecting corona discharge from said dielectric discontinuities.
2. The method of claim 1 where: said stressing voltage is a direct voltage.
3. The method of claim 1 wherein: said stressing voltage is an alternating voltage.
4. The method of claim 2 wherein: said stressing voltage has a maximum value of about 300 volts.
5. The method of claim 3 wherein: said stressing voltage has a peak-to-peak value of about 50% above the rated value of said cable.
6. The method of claim 1 wherein: said penetrating radiation is X-rays.
7. The method of claim 1 wherein: said penetrating radiation is gamma rays.

8. The method of claim 1 wherein: said bursts of penetrating radiation are emitted at repetition rate of approximately 60 times per second.

9. The method of claim 1 wherein: said bursts of radiation have a duration only long enough to assure discharge of ionization occurring in dielectric discontinuities contained in said cable.

10. The method of claim 1 wherein: said bursts of radiation have a duration of about nine milliseconds.

11. The method of claim 1 comprising the further step of: causing relative movement between said cable and the source of said radiation.

12. The method of claim 11 wherein: said bursts of radiation are emitted at a repetition rate related to the rate of movement of said cable with respect to said source of radiation so as to provide approximately three bursts for each two inches of cable.

13. The method of claim 11 wherein: said relative movement is caused by maintaining said source of radiation in a fixed position and moving said cable past said source.

14. The method of claim 11 wherein: said relative movement is caused by maintaining said cable in a fixed position and moving said radiation source along said cable.

15. The method of claim 1 comprising the further step of: marking said cable in response to detection of corona discharge exceeding a predetermined value to indicate the location in the cable of a dielectric discontinuity.

16. Apparatus for inspecting electric cable, said apparatus comprising:
   voltage source means for applying a stressing voltage between a conductor internal to a cable to be tested and an electrode external to said cable at a magnitude sufficient to cause some ionization of dielectric discontinuities within said cable but below the corona inception level,
   radiation source means for periodically irradiating said cable with short bursts of highly penetrating radiation having a duration only long enough to assure discharge of said ionization, and
   detector means for detecting corona discharge from said dielectric discontinuities.

17. The apparatus of claim 16 wherein: said voltage source means is a source of direct voltage.

18. The apparatus of claim 16 wherein: said voltage source means is a source of alternating voltage.

19. The apparatus of claim 17 wherein: said direct voltage has a maximum value of about 300 volts.

20. The apparatus of claim 18 wherein: said alternating voltage has a peak-to-peak value of about 50% above the rated value of said cable.

21. The apparatus of claim 16 wherein: said radiation source means is an X-ray source.

22. The apparatus of claim 16 wherein: said radiation source means is a grid controlled X-ray tube, and means supplying a pulsed signal to the control grid of said X-ray tube to cause said X-ray tube to emit periodic bursts of X-rays.

23. The apparatus of claim 16 wherein: said radiation source means is a gamma ray source.

24. The apparatus of claim 16 wherein:
   said radiation source means is a gamma ray source, and
   means for alternately blocking and passing gamma rays from said source to provide periodic bursts of gamma rays.

25. The apparatus of claim 16 wherein: said radiation source means emits said bursts of radiation at a repetition rate of approximately 60 times per second.

26. The apparatus of claim 16 wherein: said radiation source means emits bursts of radiation having a duration of about nine milliseconds.

27. The apparatus of claim 16 further comprising: motion producing means for causing relative movement between said cable and said radiation source means.

28. The apparatus of claim 27 wherein: said radiation source means emits bursts of radiation at a repetition rate related to the rate of movement of said cable with respect to said radiation source means so as to provide approximately three bursts for each two inches of cable.

29. The apparatus of claim 27 wherein:
   said motion producing means comprises means for maintaining said radiation source means in a fixed position, and
   means for moving said cable past said radiation source means.

30. The apparatus of claim 27 wherein:
   said motion producing means comprises means for maintaining said cable in a fixed position; and
   means for moving said radiation source along said cable.

31. The apparatus of claim 16 further comprising: means for marking said cable in response to detection of corona discharge exceeding a predetermined value to indicate the location in the cable of a dielectric discontinuity.

32. The apparatus of claim 16 wherein: said electrode is external to said cable.

References Cited

UNITED STATES PATENTS

| | | | |
|---|---|---|---|
| 2,937,336 | 5/1960 | Gooding | 324—54 |
| 3,096,478 | 7/1963 | Brown | 324—54 |
| 3,156,863 | 11/1964 | Wakefield | 324—54 |
| 3,263,165 | 7/1966 | Eigen | 324—54 |

RUDOLPH V. ROLINEC, Primary Examiner

G. R. STRECKER, Assistant Examiner